US011864194B2

(12) United States Patent
Li et al.

(10) Patent No.: US 11,864,194 B2
(45) Date of Patent: *Jan. 2, 2024

(54) SERVICE DATA TRANSMISSION METHOD, USER EQUIPMENT, AND NETWORK DEVICE

(71) Applicant: HUAWEI TECHNOLOGIES CO., LTD., Guangdong (CN)

(72) Inventors: Guorong Li, Shenzhen (CN); Yongbo Zeng, Shenzhen (CN); Yu Cai, Beijing (CN); Fenghui Dou, Beijing (CN); Nathan Edward Tenny, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

This patent is subject to a terminal disclaimer.

(21) Appl. No.: 17/383,746

(22) Filed: Jul. 23, 2021

(65) Prior Publication Data
US 2022/0046685 A1     Feb. 10, 2022

Related U.S. Application Data

(63) Continuation of application No. 16/301,392, filed as application No. PCT/CN2016/082138 on May 13, 2016, now Pat. No. 11,096,209.

(51) Int. Cl.
*H04W 72/00* (2023.01)
*H04W 76/27* (2018.01)
(Continued)

(52) U.S. Cl.
CPC ........... *H04W 72/23* (2023.01); *H04L 1/0003* (2013.01); *H04L 1/0009* (2013.01); *H04W 72/12* (2013.01); *H04W 76/27* (2018.02)

(58) Field of Classification Search
CPC ..... H04W 72/23; H04W 72/12; H04W 76/27; H04L 1/0003; H04L 1/0009
(Continued)

(56) References Cited

U.S. PATENT DOCUMENTS 7,124,059 B2   10/2006   Wetzer et al.
7,136,837 B2   11/2006   Jackson et al.
(Continued)

FOREIGN PATENT DOCUMENTS

AU     2009294982 A1 *  3/2011   ........... H04L 1/1607
AU     2013387527 B2 *  4/2016   ........... H04W 24/10
(Continued)

OTHER PUBLICATIONS

3GPP TR 36.885 V1.0.0 (Mar. 2016),3rd Generation Partnership Project;Technical Specification Group Radio Access Network;Study on LTE-based V2X Services;(Release 14), Mar. 2016. total 88 pages.
(Continued)

*Primary Examiner* — Mahendra R Patel
(74) *Attorney, Agent, or Firm* — Fish & Richardson P.C.

(57) ABSTRACT

A service data transmission method, user equipment, and a network device are provided. The method includes: determining, by a network device, a control message used to indicate at least two SPS configurations, and sending the control message to user equipment; and receiving, by the user equipment, the control message sent by the network device, and activating the at least two SPS configurations based on the control message, where each of the at least two activated SPS configurations is used to transmit corresponding service data. In embodiments of the present invention, at least two SPS configurations can be simultaneously performed, thereby improving service data transmission efficiency.

20 Claims, 9 Drawing Sheets

(51) Int. Cl.
*H04W 72/23* (2023.01)
*H04L 1/00* (2006.01)
*H04W 72/12* (2023.01)

(58) Field of Classification Search
USPC .......................................................... 370/329
See application file for complete search history.

(56) References Cited

U.S. PATENT DOCUMENTS

| | | | |
|---|---|---|---|
| 7,818,751 B2 | 10/2010 | Togawa | |
| 9,445,365 B2 | 9/2016 | Makharia et al. | |
| 10,129,905 B2 | 11/2018 | Dudda et al. | |
| 10,631,287 B2 | 4/2020 | Ryoo et al. | |
| 2010/0195605 A1* | 8/2010 | Suzuki | H04W 76/28 370/329 |
| 2011/0103327 A1* | 5/2011 | Lee | H04W 4/90 370/329 |
| 2011/0223924 A1* | 9/2011 | Lohr | H04L 1/1607 455/450 |
| 2012/0113831 A1* | 5/2012 | Pelletier | H04L 5/0053 370/252 |
| 2013/0039297 A1 | 2/2013 | Wang | |
| 2013/0142140 A1* | 6/2013 | Tseng | H04W 76/20 370/329 |
| 2013/0182679 A1* | 7/2013 | Seo | H04L 5/0053 370/330 |
| 2013/0294247 A1* | 11/2013 | Zhu | H04W 72/52 370/235 |
| 2013/0301582 A1* | 11/2013 | Jiang | H04W 72/23 370/329 |
| 2014/0036806 A1* | 2/2014 | Chen | H04L 5/0035 370/329 |
| 2014/0177487 A1* | 6/2014 | Hammarwall | H04W 72/23 370/336 |
| 2015/0181571 A1* | 6/2015 | Park | H04W 52/0216 370/252 |
| 2015/0215097 A1 | 7/2015 | Yi et al. | |
| 2015/0282210 A1 | 10/2015 | Li et al. | |
| 2015/0296490 A1* | 10/2015 | Yi | H04L 1/1812 370/329 |
| 2015/0334769 A1* | 11/2015 | Kim | H04L 1/1864 370/329 |
| 2016/0198508 A1* | 7/2016 | Lee | H04W 72/02 370/329 |
| 2017/0019887 A1 | 1/2017 | Jiang et al. | |
| 2017/0195028 A1* | 7/2017 | Shimezawa | H04B 7/0626 |
| 2017/0230816 A1* | 8/2017 | Chatterjee | H04W 72/23 |
| 2018/0160418 A1* | 6/2018 | Luo | H04W 72/1263 |
| 2018/0176753 A1* | 6/2018 | Kim | H04W 72/23 |
| 2019/0116609 A1* | 4/2019 | Feng | H04W 72/1263 |

FOREIGN PATENT DOCUMENTS

| | | | | |
|---|---|---|---|---|
| CA | 2737806 A1 | * | 3/2010 | .......... H04W 72/042 |
| CA | 2801696 A1 | * | 12/2011 | ............. H04B 7/208 |
| CA | 2854539 A1 | * | 5/2013 | .......... H04L 1/1887 |
| CN | 101677448 | | 3/2010 | |
| CN | 102158973 | | 8/2011 | |
| CN | 104936302 | | 9/2015 | |
| CN | 105453672 A | * | 3/2016 | ............ H04W 72/02 |
| CN | 104936302 B | * | 8/2018 | ............ H04L 1/1896 |
| CN | 107333334 B | * | 1/2020 | ............. H04W 4/70 |
| EP | 2658330 A1 | * | 10/2013 | ............ H04L 1/1896 |
| GB | 201205973 | | 5/2012 | |
| GB | 2500896 | | 10/2013 | |
| TW | 201204148 A | * | 1/2012 | ............. H04W 4/08 |
| TW | 201208294 A | * | 2/2012 | ............ H04L 1/1614 |
| WO | WO-2010111858 A1 | * | 10/2010 | ............ H04W 72/12 |
| WO | WO-2013131264 A1 | * | 9/2013 | ............ H04W 72/04 |
| WO | 2013169173 | | 11/2013 | |
| WO | WO-2014027763 A1 | * | 2/2014 | ............. H04L 1/188 |
| WO | 2015174790 | | 11/2015 | |
| WO | WO-2015174790 A1 | * | 11/2015 | ............... H04L 1/18 |

OTHER PUBLICATIONS

3GPP TS 36.211 V13.1.0 (Mar. 2016), 3rd Generation Partnership Project;Technical Specification Group Radio Access Network;Evolved Universal Terrestrial Radio Access (E-UTRA); Physical channels and modulation(Release 13), Mar. 2016. total 155 pages.

3GPP TSG-RAN WG2 #93, R2-161565, Ericsson: "Discussion on Uu Enhancements for V2X", Malta, Feb. 15-19, 2016. total 8 pages.

Extended European Search Report issued in European Application No. 16901361.2 dated Mar. 21, 2019, 7 pages.

International Search Report and Written Opinion issued in International Application No. PCT/CN2016/082138 dated Feb. 3, 2017, 23 pages.

Motorola (R2-104001), "SPS Scheduling for SID VoIP Packets," 3GPP TSG RAN WG2 #70bis, Stockholm, Sweden, Jun. 28-Jul. 2, 2010, 3 pages.

* cited by examiner

SERVICE DATA TRANSMISSION METHOD, USER EQUIPMENT, AND NETWORK DEVICE

CROSS-REFERENCE TO RELATED APPLICATION

This application is a continuation of U.S. patent application Ser. No. 16/301,392, filed on Nov. 13, 2018, which is a national stage of International Application No. PCT/CN2016/082138, filed on May 13, 2016. Both of the aforementioned applications are hereby incorporated by reference in their entireties.

TECHNICAL FIELD

The present invention relates to the field of communications technologies, and in particular, to a service data transmission method, user equipment, and a network device in Long Term Evolution (Long Term Evolution, LTE).

BACKGROUND

Rapid development of LTE provides an opportunity for the automotive industry to implement a concept of "Internet of Vehicles". A vehicle may be connected to the Internet, another vehicle, a base station, or the like through an LTE network, so that the vehicle exchanges information with the outside world to implement various services. V2X (Vehicle to X) is a key technology of the Internet of Vehicles, and includes vehicle to vehicle (Vehicle to Vehicle, V2V) communication, vehicle to pedestrian (Vehicle to Pedestrian, V2P) communication, and vehicle to infrastructure/network (Vehicle to Infrastructure/Network, V2I/N) communication. Through V2X, a vehicle can obtain a series of traffic information such as a real-time road condition, road information, and pedestrian information, thereby improving driving safety, reducing congestion, improving traffic efficiency, providing in-vehicle entertainment information, and the like.

Semi-persistent scheduling (Semi-Persistent Scheduling, SPS) means that resource scheduling is pre-configured and periodic. A base station (eNodeB, eNB) configures an SPS period for user equipment (User Equipment, UE) by using a radio resource control (Radio Resource Control, RRC) message, and activates the SPS period by using control signaling transmitted on a physical downlink control channel (Physical Downlink Control Channel, PDCCH). The UE receives and sends data at a corresponding time point based on the SPS period. Therefore, the SPS is characterized by that an allocated resource can be used for a plurality of times, and compared with dynamic scheduling, the SPS can reduce overheads of the control signaling on the PDCCH. The SPS is quite useful for a periodic service whose packet size basically remains unchanged, for example, a Voice over Internet Protocol (Voice over Internet Protocol, VoIP).

However, for a V2X service, because generation of a data packet is affected by external conditions such as a geographical location, a speed, and a direction of a vehicle, a period of the V2X service may change. A packet size of the V2X service depends on a used security certificate, and because overheads of an upper-layer header may change, the packet size of the V2X service may change. In the foregoing SPS, one UE can use only one SPS period allocated by an eNB to receive and send data, which constitutes some specific limitations, and consequently data transmission efficiency is affected. In addition, because the period and/or the packet size of the V2X service may dynamically change, the foregoing SPS is no longer suitable for the V2X service.

SUMMARY

Embodiments of the present invention provide a service data transmission method, user equipment, and a network device, so that at least two SPS configurations can be performed, thereby improving service data transmission efficiency.

A first aspect of the embodiments of the present invention provides a service data transmission method, including:

receiving, by user equipment, a control message sent by a network device, where the control message is used to indicate at least two SPS configurations;

activating, by the user equipment, the at least two SPS configurations based on the control message; and transmitting, by the user equipment, corresponding service data based on each of the at least two activated SPS configurations.

The user equipment activates the at least two SPS configurations based on the control message that indicates the at least two SPS configurations and that is sent by the network device, so as to overcome a prior-art limitation that only one SPS configuration can be activated at a time. In this way, SPS is more flexible, and service data transmission efficiency can be improved to some extent. The control message is implemented as control signaling on a PDCCH or control signaling on an enhanced PDCCH. The network device needs to send only once the control message that indicates the at least two SPS configurations, thereby reducing control signaling overheads. The SPS configuration may include configuration information such as an SPS period, an SPS resource, modulation and coding scheme MCS configuration information, and a physical resource. Although the control message indicates the SPS configuration, the user equipment cannot directly use the SPS configuration. Only after the SPS configuration is activated, the user can use the SPS configuration to transmit service data. The service data may be data corresponding to a service whose period and/or packet size changes, or may be data corresponding to a service whose period and packet size are fixed, so as to overcome a prior-art limitation that both a period and a packet size are fixed, thereby expanding an application range of the embodiments of the present invention.

In a possible implementation, before receiving the control message sent by the network device, the user equipment sends a service indication message to the network device, where the service indication message includes a service period of each of at least two services, and is used to instruct the network device to determine the control message based on the service period of each service and send the control message to the user equipment. Alternatively, before the network device sends the service indication message, the user equipment establishes a connection to the network device, and the network device obtains the service periods of the at least two services of the user equipment, to determine the control message.

In a possible implementation, before sending the service indication message to the network device, the user equipment receives an RRC message that includes preset SPS information and that is sent by the network device, where the preset SPS information is used to indicate a pre-configured SPS period. The pre-configured SPS period may or may not be related to the activated SPS configuration. In other words, the activated SPS configurations may match at least two SPS periods of the pre-configured SPS period, or may match other SPS periods, so as to overcome a prior-art limitation that an activated SPS configuration can match only an SPS period in an RRC message.

In a possible implementation, the preset SPS information includes at least two SPS pre-configurations and a pre-configuration index corresponding to each of the at least two SPS pre-configurations, and the SPS pre-configuration includes a pre-configured SPS period. In this implementation, the control message includes the pre-configuration index corresponding to each of the at least two SPS pre-configurations; and a specific process of activating, by the user equipment, the at least two SPS configurations based on the control message is:

decoding, by the user equipment, the control message based on an MCS;

searching, by the user equipment, for a pre-configured SPS period of each of the at least two SPS configurations based on the pre-configuration index corresponding to each SPS pre-configuration; and activating, by the user equipment, an SPS configuration that matches the pre-configured SPS period of each SPS configuration.

In this implementation, the user equipment activates the SPS configuration based on the RRC message, to be specific, the activated SPS configurations match several pre-configured SPS periods in the RRC message. A quantity of SPS pre-configurations in the RRC message is greater than a quantity of the at least two SPS configurations. A difference between the SPS pre-configuration and the SPS configuration lies in that the SPS pre-configuration only includes a pre-configured SPS period, but the SPS configuration not only includes an SPS period, but also includes other configuration information.

In a possible implementation, the preset SPS information includes a pre-configured SPS period, and includes only one pre-configured SPS period in this case. A period value of the pre-configured SPS period may be relatively small. In this implementation, the control message includes an SPS period of each of the at least two SPS configurations, or the control message includes an SPS period of each of the at least two SPS configurations and a configuration index of each of the at least two SPS configurations; and a specific process of activating, by the user equipment, the at least two SPS configurations based on the control message is:

decoding, by the user equipment, the control message based on an MCS; and activating, by the user equipment, an SPS configuration that matches the SPS period of each SPS configuration.

In this implementation, the user equipment activates the SPS configuration based on the SPS period, of the SPS configuration, that is included in the control message. In this case, the SPS period is independent of the pre-configured SPS period in the RRC message, and the SPS period included in the control message is a period required by the user equipment for transmission in actual application.

In a possible implementation, the preset SPS information includes a pre-configured SPS period, at least two pre-configured SPS processes, and a process identifier of each of the at least two pre-configured SPS processes. In this implementation, the control message includes a process identifier of a pre-configured SPS process of each of the at least two SPS configurations and an SPS period of each of the at least two SPS configurations; and a specific process of activating, by the user equipment, the at least two SPS configurations based on the control message is:

decoding, by the user equipment, the control message based on an MCS; and activating, by the user equipment based on the process identifier of the pre-configured SPS process of each SPS configuration, an SPS configuration that matches the SPS period of each SPS configuration.

In this implementation, the user equipment activates the SPS configuration based on the SPS period, of the SPS configuration, that is included in the control message. In this case, the SPS period is independent of the pre-configured SPS period in the RRC message, and the SPS period included in the control message is a period required by the user equipment for transmission in actual application. The process identifiers of the pre-configured SPS process are used to identify different pre-configured SPS processes. It can be understood that one pre-configured SPS process indicates a different service of the user equipment.

In a possible implementation, the preset SPS information includes or does not include a pre-configured SPS period. In this implementation, the control message includes an SPS period of each of the at least two SPS configurations, or the control message includes an SPS period of each of the at least two SPS configurations and a configuration index of each of the at least two SPS configurations; and a specific process of activating, by the user equipment, the at least two SPS configurations based on the control message is:

decoding, by the user equipment, the control message based on an MCS; and activating, by the user equipment, an SPS configuration that matches the SPS period of each SPS configuration.

In this implementation, the user equipment activates the SPS configuration based on the SPS period, of the SPS configuration, that is included in the control message. In this case, the SPS period is independent of the pre-configured SPS period in the RRC message, and the SPS period included in the control message is a period required by the user equipment for transmission in actual application.

In a possible implementation, the RRC message further includes the MCS, or the control message further includes the MCS.

In a possible implementation, after the user equipment transmits the corresponding service data based on each of the at least two activated SPS configurations, the user equipment receives a release message sent by the network device, where the release message is used to indicate a to-be-released target SPS configuration, and the user equipment releases the target SPS configuration based on the release message. The target SPS configuration is an activated SPS configuration. The release message is control signaling on a PDCCH or control signaling on an enhanced PDCCH.

In a possible implementation, when the preset SPS information includes at least two SPS pre-configurations and a pre-configuration index corresponding to each of the at least two SPS pre-configurations, the release message includes a pre-configuration index corresponding to the target SPS configuration; when the preset SPS information includes a pre-configured SPS period, the release message includes an SPS period of the target SPS configuration or a configuration index corresponding to the target SPS configuration; when the preset SPS information includes a pre-configured SPS period, at least two pre-configured SPS processes, and a process identifier of each of the at least two pre-configured SPS processes, the release message includes a process identifier of a pre-configured SPS process of the target SPS configuration; or when the preset SPS information includes or does not include a pre-configured SPS period, the control message includes an SPS period of the target SPS configuration or a configuration index corresponding to the target SPS configuration.

In a possible implementation, the target SPS configuration is an SPS configuration of a service whose period and/or packet size changes. After releasing the target SPS configuration of the service, the user equipment needs to allocate a new SPS configuration for service data of the service, and a specific process is:

receiving, by the user equipment, an activation message sent by the network device, where the activation message includes a new SPS period required by service data corresponding to the target SPS configuration; and activating, by the user equipment based on the activation message, an SPS configuration that matches the new SPS period.

In this implementation, the activation message is control signaling on a PDCCH or control signaling on an enhanced PDCCH, and is similar to the control message. The network device does not need to send the RRC message again for reconfiguration, thereby reducing a delay and improving processing efficiency.

In a possible implementation, after the user equipment transmits the corresponding service data based on each of the at least two activated SPS configurations, the user equipment receives an update message sent by the network device, where the update message includes a to-be-updated target SPS period or a configuration index of a to-be-updated target SPS configuration, and the user equipment activates, based on the update message, an SPS configuration that matches the target SPS period. Optionally, the target SPS period or the target SPS configuration is an SPS period or an SPS configuration corresponding to a service whose period and/or packet size changes.

In this implementation, the update message is control signaling on a PDCCH or control signaling on an enhanced PDCCH, and is similar to the control message. The network device does not need to send the RRC message again for reconfiguration, thereby reducing a delay and improving processing efficiency.

In a possible implementation, after the user equipment transmits the corresponding service data based on each of the at least two activated SPS configurations, the user equipment receives an update message sent by the network device, where the update message includes a process identifier of a pre-configured SPS process of a to-be-updated target SPS configuration, and the user equipment activates, based on the update message, an SPS configuration that matches an SPS period of the target SPS configuration. Optionally, the target SPS period or the target SPS configuration is an SPS period or an SPS configuration corresponding to a service whose period and/or packet size changes.

In this implementation, the update message is control signaling on a PDCCH or control signaling on an enhanced PDCCH, and is similar to the control message. The network device does not need to send the RRC message again for reconfiguration, thereby reducing a delay and improving processing efficiency.

In a possible implementation, there is one control message. When a quantity of services of the user equipment is relatively large, at least two SPS configurations can be allocated by using one control message, thereby reducing control signaling overheads and improving processing efficiency.

In a possible implementation, the control message includes at least two control sub-messages. A quantity of the at least two control sub-messages is equal to a quantity of the at least two SPS configurations, that is, one SPS configuration is corresponding to one control sub-message.

In a possible implementation, when the user equipment supports simultaneous data transmission in two or more SPS periods, if there is an intersecting moment in SPS periods of two or more services, the user equipment may simultaneously transmit the two or more services at the intersecting moment without affecting one another, thereby improving resource utilization.

A second aspect of the embodiments of the present invention provides a service data transmission method, including:

determining, by a network device, a control message, where the control message is used to indicate at least two SPS configurations; and sending, by the network device, the control message to user equipment, so that the user equipment activates the at least two SPS configurations based on the control message, and transmits corresponding service data based on each of the at least two activated SPS configurations.

In a possible implementation, before determining the control message, the network device receives a service indication message sent by the user equipment, where the service indication message includes a service period of each of at least two services of the user equipment.

In a possible implementation, the network device determines the control message based on the service period of each service in the service indication message.

In a possible implementation, before the network device determines the control message, the network device sends an RRC message that includes preset SPS information to the user equipment, where the preset SPS information is used to indicate a pre-configured SPS period.

In a possible implementation, the preset SPS information includes at least two SPS pre-configurations and a pre-configuration index corresponding to each of the at least two SPS pre-configurations, and the SPS pre-configuration includes a pre-configured SPS period; and the control message includes the pre-configuration index corresponding to each of the at least two SPS pre-configurations.

In a possible implementation, the preset SPS information includes a pre-configured SPS period; and the control message includes an SPS period of each of the at least two SPS configurations, or the control message includes an SPS period of each of the at least two SPS configurations and a configuration index of each of the at least two SPS configurations.

In a possible implementation, the preset SPS information includes a pre-configured SPS period, at least two pre-configured SPS processes, and a process identifier of each of the at least two pre-configured SPS processes; and the control message includes a process identifier of a pre-configured SPS process of each of the at least two SPS configurations and an SPS period of each of the at least two SPS configurations.

In a possible implementation, the preset SPS information includes or does not include a pre-configured SPS period; and the control message includes an SPS period of each of the at least two SPS configurations, or the control message includes an SPS period of each of the at least two SPS configurations and a configuration index of each of the at least two SPS configurations.

In a possible implementation, the RRC message further includes the MCS, or the control message further includes the MCS.

In a possible implementation, after the network device sends the control message to the user equipment, the network device sends a release message to the user equipment, where the release message is used to indicate a to-be-released target SPS configuration, and the user equipment releases the target SPS configuration based on the release message.

In a possible implementation, after sending the release message to the user equipment, the network device sends an activation message to the user equipment, where the activation message includes a new SPS period required by service data corresponding to the target SPS configuration, and the user equipment activates, based on the activation message, an SPS configuration that matches the new SPS period.

In a possible implementation, after sending the control message to the user equipment, the network device sends an update message to the user equipment, where the update message includes a to-be-updated target SPS period or a configuration index of a to-be-updated target SPS configuration, and the user equipment activates, based on the update message, an SPS configuration that matches the target SPS period.

In a possible implementation, after sending the control message to the user equipment, the network device sends an update message to the user equipment, where the update message includes a process identifier of a pre-configured SPS process of a to-be-updated target SPS configuration, and the user equipment activates, based on the update message, an SPS configuration that matches an SPS period of the target SPS configuration.

In a possible implementation, the control message, the release message, the activation message, and the update message are control signaling on a PDCCH or control signaling on an enhanced PDCCH.

A third aspect of the embodiments of the present invention provides user equipment, including:

a receiving unit, configured to receive a control message sent by a network device, where the control message is used to indicate at least two SPS configurations; and a processing unit, configured to activate the at least two SPS configurations based on the control message, and transmit corresponding service data based on each of the at least two activated SPS configurations.

The user equipment provided in the third aspect of the embodiments of the present invention is configured to perform the method according to any one of the first aspect or the possible implementations of the first aspect of the embodiments of the present invention.

A fourth aspect of the embodiments of the present invention provides a network device, including:

a processing unit, configured to determine a control message, where the control message is used to indicate at least two SPS configurations; and a sending unit, configured to send the control message to user equipment, so that the user equipment activates the at least two SPS configurations based on the control message, and transmits corresponding service data based on each of the at least two activated SPS configurations.

The network device provided in the fourth aspect of the embodiments of the present invention is configured to perform the method according to any one of the second aspect or the possible implementations of the second aspect of the embodiments of the present invention.

A fifth aspect of the embodiments of the present invention provides another user equipment, including:

a receiver, configured to receive a control message sent by a network device, where the control message is used to indicate at least two SPS configurations; and a processor, configured to activate the at least two SPS configurations based on the control message, and transmit corresponding service data based on each of the at least two activated SPS configurations.

The user equipment provided in the fifth aspect of the embodiments of the present invention is configured to perform the method according to any one of the first aspect or the possible implementations of the first aspect of the embodiments of the present invention.

A sixth aspect of the embodiments of the present invention provides another network device, including a processor, configured to determine a control message, where the control message is used to indicate at least two SPS configurations; and a transmitter, configured to send the control message to the user equipment, so that the user equipment activates the at least two SPS configurations based on the control message, and transmits corresponding service data based on each of the at least two activated SPS configurations.

The network device provided in the sixth aspect of the embodiments of the present invention is configured to perform the method according to any one of the second aspect or the possible implementations of the second aspect of the embodiments of the present invention.

A seventh aspect of the embodiments of the present invention provides a service data transmission system, including the user equipment provided in the third aspect of the embodiments of the present invention and the network device provided in the fourth aspect, or the user equipment provided in the fifth aspect of the embodiments of the present invention and the network device provided in the sixth aspect.

In the embodiments of the present invention, the network device determines the control message used to indicate the at least two SPS configurations, and sends the control message to the user equipment; and the user equipment receives the control message sent by the network device, activates the at least two SPS configurations based on the control message, and transmits the corresponding service data based on each of the at least two activated SPS configurations. In this way, at least two SPS configurations can be simultaneously performed, thereby improving service data transmission efficiency.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

A network architecture and a service scenario described in the embodiments of the present invention are intended to describe the technical solutions in the embodiments of the present invention more clearly, and do not constitute any limitation on the technical solutions provided in the embodiments of the present invention. A person of ordinary skill in the art may understand that with evolution of network architectures and emergence of new service scenarios, the technical solutions provided in the embodiments of the present invention are also applicable to a similar technical problem.

Figure 1:
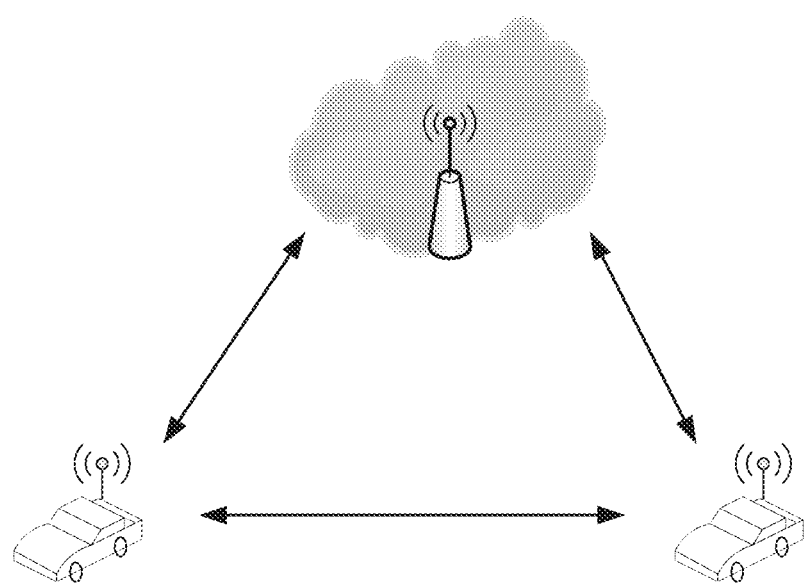
FIG. 1 is a schematic architectural diagram of a network to which an embodiment of the present invention is applied.

Referring to FIG. 1, FIG. 1 is a schematic architectural diagram of a network to which an embodiment of the present invention is applied. The schematic architectural diagram of the network may represent a mobile communications wireless network in an LTE system, and includes an evolved UMTS terrestrial radio access network (Evolved UMTS Terrestrial Radio Access Network, E-UTRAN) that includes at least two eNBs, and at least two user equipments. The user equipment is a vehicle having a wireless communication function. The user equipment in this embodiment of the present invention is not limited to the vehicle, and may include other electronic devices having a wireless communication function, for example, a mobile phone, a tablet computer, and a wearable device. The user equipments may communicate with each other by using an air interface PC5, for example, transmitting information between vehicles and obtaining driving information of another vehicle. The user equipment and the eNB may communicate with each other by using an air interface Uu. The user equipment sends data to the eNB in an uplink direction, and the eNB sends data, a message, signaling, or the like to the user equipment in a downlink direction.

Based on the schematic architectural diagram of the network shown in FIG. 1, a service transmitted between the user equipments and a service transmitted between the user equipment and the eNB are V2X services. Different V2X services may have different periods and packet sizes, and a period and a packet size of a V2X service may also change. The service mentioned in this embodiment of the present invention may be a V2X service whose period and/or packet size may change, or may be another type of service whose period and/or packet size may change, or may be a service whose period and packet size is fixed. It can be understood that the services mentioned in this embodiment of the present invention are all to-be-transmitted services, and the to-be-transmitted service is a service of the user equipment or a service of a network device.

In this embodiment of the present invention, the user equipment may include but is not limited to the vehicle shown in FIG. 1, a mobile phone, a tablet computer, a wearable device, and the like. The network device may include but is not limited to the eNB shown in FIG. 1 and a base station.

Based on the schematic architectural diagram of the network shown in FIG. 1, the solutions provided in the embodiments of the present invention are described below with reference to FIG. 2 to FIG. 6.

Figure 2:
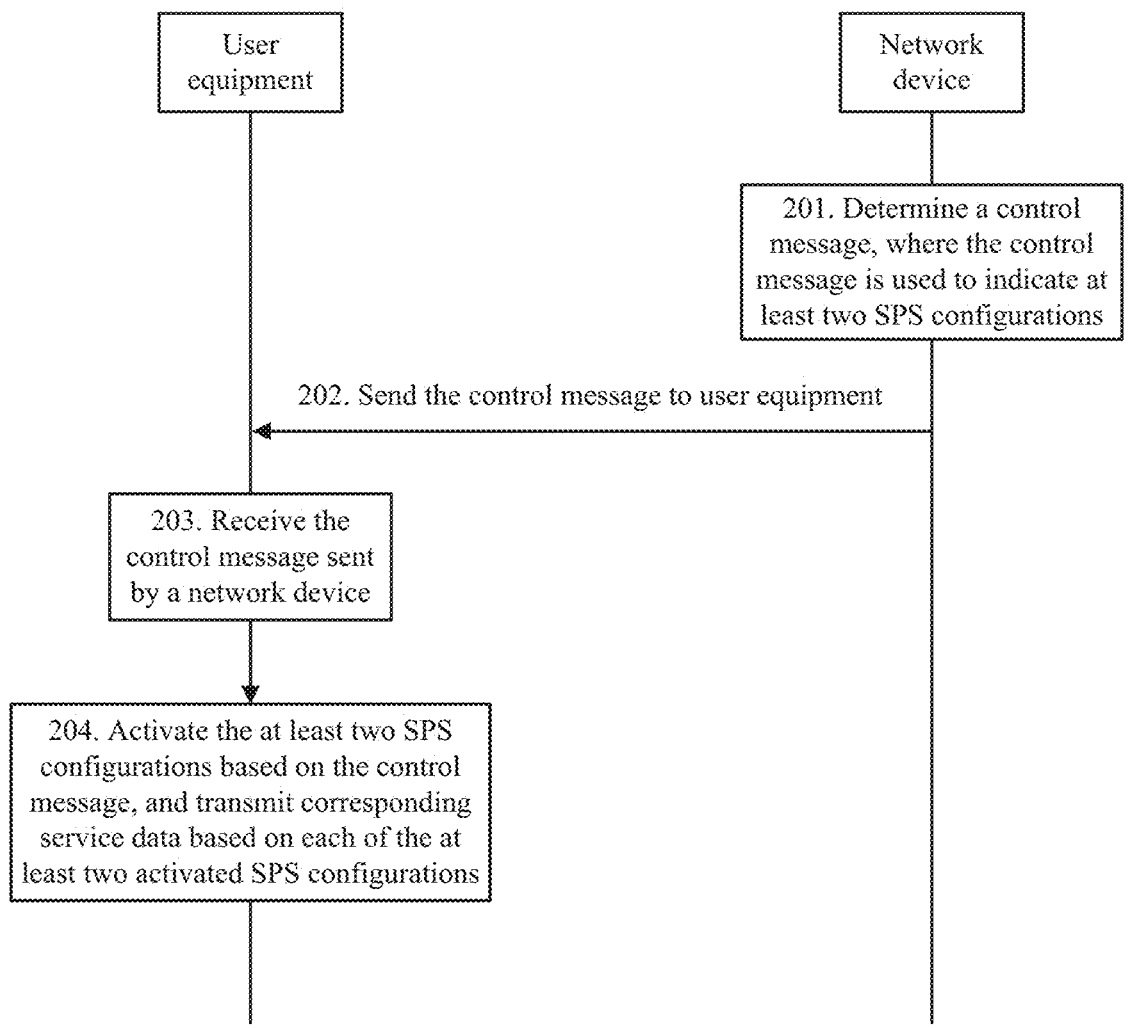
FIG. 2 is a schematic flowchart of a service data transmission method according to Embodiment 1 of the present invention.

Referring to FIG. 2, FIG. 2 is a schematic flowchart of a service data transmission method according to Embodiment 1 of the present invention. As shown in FIG. 2, the method provided in Embodiment 1 of the present invention may include the following content of 201 to 204.

201. A network device determines a control message, where the control message is used to indicate at least two SPS configurations.

Specifically, before determining the control message, the network device establishes an RRC connection between the network device and user equipment, so that the network device and the user equipment may transmit information to each other.

In a possible implementation, the user equipment detects whether there are at least two to-be-transmitted services, and when a detection result is yes, sends a service indication message to the network device by using an interface Uu between the user equipment and the network device. The service indication message includes a service period of each of the at least two to-be-transmitted services, and is used to instruct the network device to determine the control message based on the service period of each to-be-transmitted service and send the control message. It can be understood that the user equipment notifies the network device of the period required by the to-be-transmitted service by using the service indication message, so that the network device determines a period to be allocated to the to-be-transmitted service. Optionally, the user equipment sends one service indication message to the network device, and the service indication message includes a service period of each of the at least two to-be-transmitted services. Optionally, the user equipment sends at least two service indication messages to the network device, and each of the at least two service indication messages includes a service period of a corresponding to-be-transmitted service.

The network device receives, by using the interface Uu between the user equipment and the network device, the service indication message sent by the user equipment, and obtains the service period of each of the at least two to-be-transmitted services. The network device determines the control message based on the service period of each to-be-transmitted service. The control message is used to indicate the at least two SPS configurations, and the at least two SPS configurations include SPS configurations required by the to-be-transmitted services. The SPS configuration may include configuration information such as an SPS period, an SPS resource, MCS configuration information, and a physical resource. Optionally, there is one control message, and the control message is used to indicate an SPS configuration that is allocated by the network device to each of the at least two to-be-transmitted services. Optionally, the control message includes at least two control sub-messages, and one control sub-message is corresponding to one SPS configuration. A quantity of the control sub-messages is the same as a quantity of the at least two SPS configurations. In other words, the quantity of the control sub-messages is the same as a quantity of the at least two to-be-transmitted services. In this way, each control sub-message is corresponding to one to-be-transmitted service.

In another possible implementation, the network device directly obtains, by using the RRC connection between the network device and the user equipment, at least two to-be-transmitted services of the user equipment and a service period of each of the to-be-transmitted services, and determines the control message based on the service period of each to-be-transmitted service. Optionally, there is one control message, and the control message is used to indicate an SPS configuration that is allocated by the network device to each of the at least two to-be-transmitted services. Optionally, the control message includes at least two control sub-messages, and one control sub-message is corresponding to one SPS configuration. A quantity of the control sub-messages is the same as a quantity of the at least two SPS configurations. In other words, the quantity of the control sub-messages is the same as a quantity of the at least two to-be-transmitted services. In this way, each control sub-message is corresponding to one to-be-transmitted service.

After the RRC connection between the network device and the user equipment is established, the network device sends an RRC message to the user equipment. The RRC message is used to indicate a pre-configured SPS period preset by the network device for the user equipment. Further, on the basis of the two foregoing possible implementations, the network device may determine the control information based on the RRC message. For example, the RRC message includes at least two pre-configured SPS periods, and the network device matches a service period of a to-be-transmitted service with the at least two pre-configured SPS periods to determine a pre-configured SPS period that matches the service period of the to-be-transmitted service, and uses the pre-configured SPS period as an SPS period that matches the service period of the to-be-transmitted service, and so on, so as to determine SPS periods that match the service periods of all of the at least two to-be-transmitted services. In this way, the control message is determined. Optionally, the network device directly determines, based on a service period of each to-be-transmitted service, an SPS period that matches the service period of the to-be-transmitted service, so as to determine the control message.

The control message is a PDCCH message or an enhanced PDCCH message. The PDCCH message is control signaling on a PDCCH, and the enhanced PDCCH message is control signaling on an enhanced PDCCH. The enhanced PDCCH may be represented as EPDCCH.

202. The network device sends the control message to user equipment.

Specifically, after determining the control message, the network device sends the control message to the user equipment by using the interface Uu between the user equipment and the network device.

203. The user equipment receives the control message sent by the network device.

Specifically, the user equipment receives, by using the interface Uu between the user equipment and the network device, the control message sent by the network device.

204. The user equipment activates the at least two SPS configurations based on the control message, and transmits corresponding service data based on each of the at least two activated SPS configurations.

Specifically, although the control message is used to indicate the at least two SPS configurations, the user equipment cannot directly obtain the SPS configurations in the control message when receiving the control message sent by the network device, and needs to first decode the control message. In addition, the control message merely indicates the at least two SPS configurations, but does not include the at least two SPS configurations. In other words, content included in the control message may indicate the at least two SPS configurations. The control message may include other control information in addition to indicating the at least two SPS configurations. After decoding the control message, the user equipment obtains the content, in the control message, that is used to indicate the at least two SPS configurations.

In a possible implementation, the content included in the control message is a pre-configuration index corresponding to each of at least two SPS pre-configurations. In another possible implementation, the content included in the control message is an SPS period of each of the at least two SPS configurations, or is an SPS period of each of the at least two SPS configurations and a configuration index of each of the at least two SPS configurations. In still another possible implementation, the content included in the control message is a process identifier of a pre-configured SPS process of each of the at least two SPS configurations and an SPS period of each of the at least two SPS configurations. In yet another possible implementation, the content included in the control message is an SPS period of each of the at least two SPS configurations, or is an SPS period of each of the at least two SPS configurations and a configuration index of each of the at least two SPS configurations.

The user equipment stores the at least two activated SPS configurations and transmits the corresponding service data by using the activated SPS configuration. The service data is data of a to-be-transmitted service. One SPS configuration is corresponding to one SPS period and one SPS resource. By using a to-be-transmitted service A as an example, the user equipment transmits data of the to-be-transmitted service A on an SPS resource of the to-be-transmitted service A based on an SPS period of the to-be-transmitted service A. The SPS resource may be a radio resource between any two or more user equipments, or may be a radio resource between the user equipment and the network device.

In a possible implementation, by using the interface Uu between the user equipment and the network device, the user equipment sends/receives service data related to a to-be-transmitted service to/from the network device. In another possible implementation, by using an interface PC5 between user equipments, the user equipment sends/receives service data related to a to-be-transmitted service to/from another user equipment.

When the user equipment supports simultaneous data transmission in two or more SPS periods, if there is an intersecting moment in SPS periods of two or more to-be-transmitted services, the user equipment may simultaneously transmit the two or more to-be-transmitted services at the intersecting moment without affecting one another, thereby improving resource utilization. When the user equipment does not support simultaneous data transmission in two or more SPS periods, if there is an intersecting moment in SPS periods of two or more to-be-transmitted services, the network device may adjust transmission of the two or more to-be-transmitted services by performing dynamic scheduling on the intersecting moment.

After the user equipment activates the at least two SPS configurations based on the control message, the user equipment receives a release message sent by the network device. The release message is used to indicate a to-be-released target SPS configuration, and the user equipment releases the target SPS configuration based on the release message. The target SPS configuration is an activated SPS configuration. The release message is control signaling on a PDCCH or control signaling on an enhanced PDCCH. When preset SPS information includes at least two SPS pre-configurations and a pre-configuration index corresponding to each of the at least two SPS pre-configurations, the release message includes a pre-configuration index corresponding to the target SPS configuration. When preset SPS information includes a pre-configured SPS period, the release message includes an SPS period of the target SPS configuration or a configuration index corresponding to the target SPS configuration. When preset SPS information includes a pre-configured SPS period, at least two pre-configured SPS processes, and a process identifier of each of the at least two pre-configured SPS processes, the release message includes a process identifier of a pre-configured SPS process of the target SPS configuration. When preset SPS information includes or does not include a pre-configured SPS period, the control message includes an SPS period of the target SPS configuration or a configuration index corresponding to the target SPS configuration.

The target SPS configuration is an SPS configuration of a service whose period and/or packet size changes. After the user equipment releases the target SPS configuration of the service, a new SPS configuration needs to be allocated to service data of the service. The user equipment receives an activation message sent by the network device, where the activation message includes a new SPS period required by service data corresponding to the target SPS configuration, and activates, based on the activation message, an SPS configuration that matches the new SPS period. In this way, the network device does not need to re-send the RRC message to reconfigure an SPS configuration for the service, thereby reducing a delay and improving processing efficiency.

In this embodiment of the present invention, the network device determines the control message used to indicate the at least two SPS configurations, and sends the control message to the user equipment; and the user equipment receives the control message sent by the network device, activates the at least two SPS configurations based on the control message, and transmits the corresponding service data based on each of the at least two activated SPS configurations. In this way, at least two SPS configurations are simultaneously performed, thereby improving service data transmission efficiency.

Figure 3:
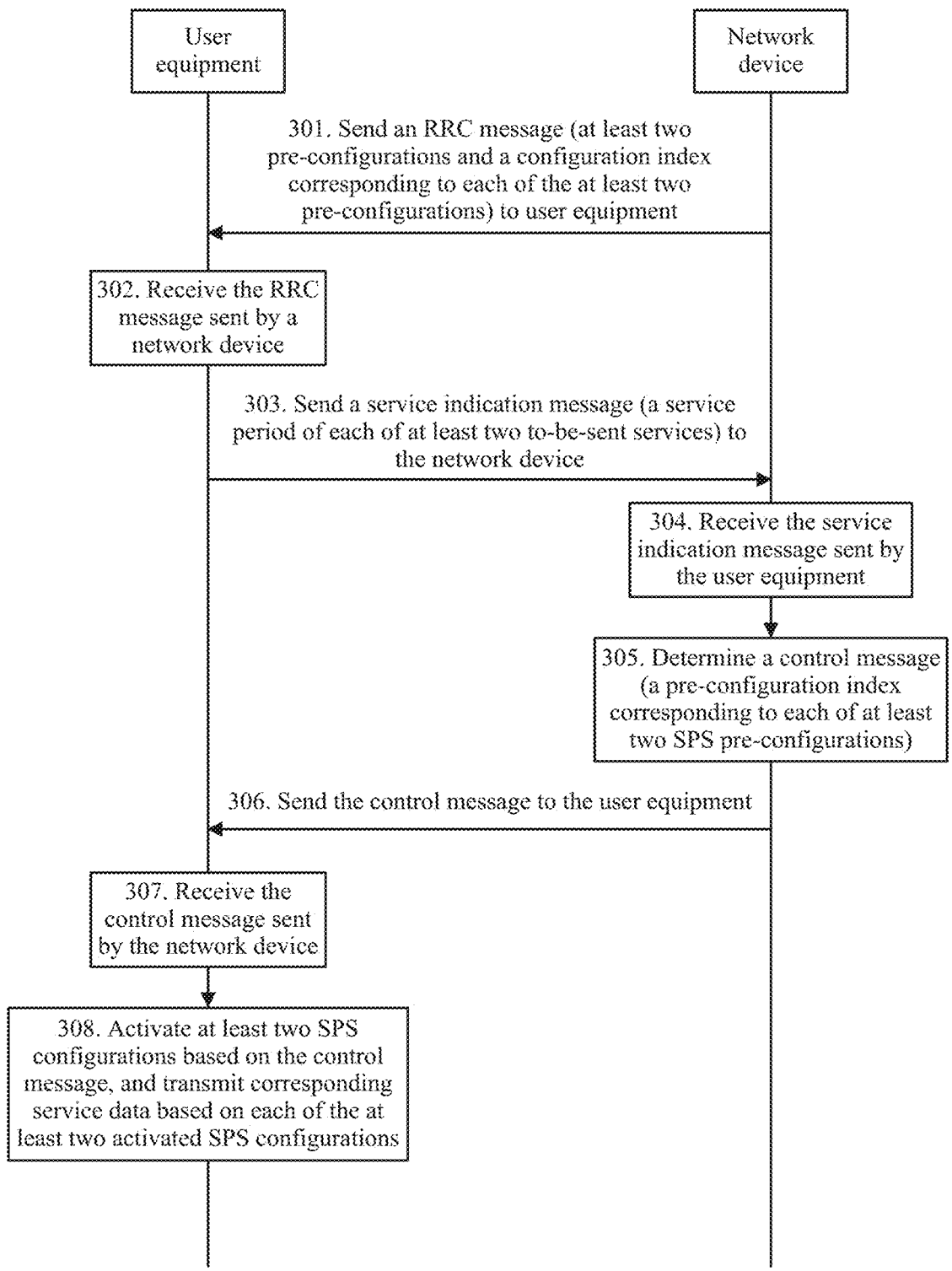
FIG. 3 is a schematic flowchart of a service data transmission method according to Embodiment 2 of the present invention.

Referring to FIG. 3, FIG. 3 is a schematic flowchart of a service data transmission method according to Embodiment 2 of the present invention. As shown in FIG. 3, the method provided in Embodiment 2 of the present invention may include the following content of 301 to 308. In the method shown in FIG. 3, for content the same as or similar to that in the method shown in FIG. 2, refer to the related detailed description of FIG. 2. Details are not repeated herein.

301. A network device sends an RRC message to user equipment, where the RRC message includes at least two pre-configurations and a configuration index corresponding to each of the at least two pre-configurations.

Figure 4:
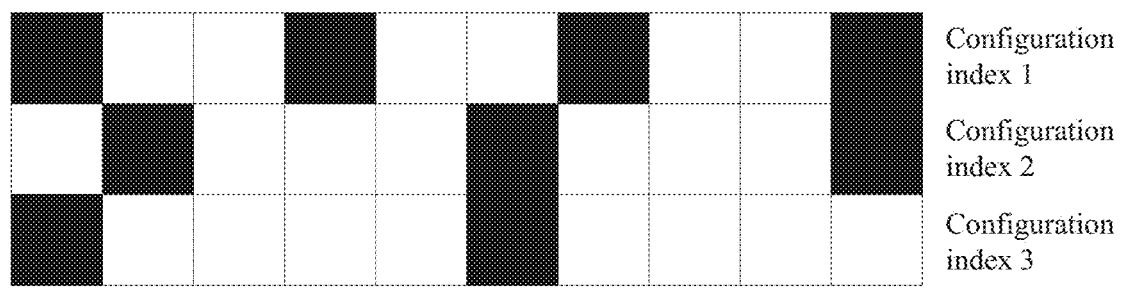
FIG. 4 is a schematic diagram of an example of an RRC message according to Embodiment 2 of the present invention.

Specifically, before sending the RRC message to the user equipment, the network device needs to establish an RRC connection between the network device and the user equipment, so that control signaling between the network device and the user equipment can be normally transmitted. After establishing the RRC connection, the network device sends the RRC message to the user equipment by using an interface Uu between the user equipment and the network device. The RRC message includes the at least two pre-configurations and the configuration index corresponding to each of the at least two pre-configurations. The pre-configuration includes only a pre-configured SPS period. The configuration index is used to identify the pre-configuration or a pre-configured SPS period in the pre-configuration. Referring to FIG. 4, FIG. 4 is a schematic diagram of an example of an RRC message according to Embodiment 2 of the present invention. The RRC message includes three configuration indexes that are respectively a configuration index 1, a configuration index 2, and a configuration index 3. Pre-configured SPS periods corresponding to the configuration index 1 are shaded portions in a first row, and there are two blank cells between every two shaded cells. Pre-configured SPS periods corresponding to the configuration index 2 are shaded portions in a second row, and there are three blank cells between every two shaded cells. Pre-configured SPS periods corresponding to the configuration index 3 are shaded portions in the second row, and there are four blank cells between every two shaded cells. The specific RRC message is as follows:

| STS—Config information element |
|---|

```
-- ASNISTART
SPS-Config ::=      SEQUENCE {
    semiPersistSchedC-RNTI      C-RNTI              OPTIONAL,   -- Need OR
    sps-ConfigDL                SPS-ConfigDL        OPTIONAL,   -- Need ON
    sps-ConfigUL                SPS-ConfigUL-List   OPTIONAL    -- Need ON
    sps-ConfigSidelink          SPS-ConfigUL-List   OPTIONAL    --Need ON
}
SPS-ConfigUL-List::=SEQUENCE (SIZE (1..8)) OF SPS-ConfigUL
SPS-ConfigUL::=    CHOICE {
    release                     NULL
    setup                       SEQUENCE {
        semiPersistSchedIntervalUL      ENUMERATED {
            sf10, sf20, sf32, sf40, sf64, sf80,
```

-continued

STS—Config information element

```
                                sf128, sf160, sf320, sf640, spare6,
                                spare5, spare4, spare3, spare2,
                                spare1},
        implicitReleaseAfter    ENUMERATED {e2, e3, e4, e8},
        numberOfConfSPS-Processes  INTEGER(1...8),
        p0-Persistent           SEQUENCE {
            p0-NominalPUSCH-Persistent    INTEGER (-126..24),
            p0-UE-PUSCH-Persistent        INTEGER (-8..7)
        }       OPTIONAL,                                  -- Need OP
        twoIntervalsConfig      ENUMERATED {true}          OPTIONAL., -- Cond
TDD
        ...,
        [[   p0-PersistentSubframeSet2-r12    CHOICE {
                release                         NULL,
                setup                           SEQUENCE {
                    p0-NominalPUSCH-PersistentSubframeSet2-r12   INTEGER (-126..24),
                    p0-UE-PUSCH-PersistentSubframeSet2-r12       INTEGER (-8..7)
                }
            }                                              OPTIONAL  --
Need ON
        ]]
    }
}
```

302. The user equipment receives the RRC message sent by the network device.

Specifically, the user equipment receives, by using the interface Uu between the user equipment and the network device, the RRC message sent by the network device. The user equipment may store the RRC message.

303. The user equipment sends a service indication message to the network device, where the service indication message includes a service period of each of at least two to-be-transmitted services.

304. The network device receives the service indication message sent by the user equipment.

305. The network device determines a control message, where the control message includes a pre-configuration index corresponding to each of at least two SPS pre-configurations.

Optionally, the network device determines the control message based on the service period of each to-be-transmitted service in the service indication message. The control message is control signaling on a PDCCH or an EPDCCH. The control message includes the pre-configuration index corresponding to each of the at least two SPS pre-configurations. It can be understood that one to-be-transmitted service is corresponding to one SPS pre-configuration.

In a possible implementation, a field is added to the control signaling on the PDCCH or the EPDCCH, to indicate a pre-configuration index that matches a service period of each to-be-transmitted service. Content of the control signaling to which the field is added is as follows, and the last row indicates the added field used to indicate the configuration index. A length of the pre-configuration index field may be determined based on a quantity of pre-configured SPS periods in the RRC message. For example, the length of the field is 2 bits, and it may be determined that there are four pre-configured SPS periods.

TPC command for scheduled PUSCH
Cyclic shift DM RS
Modulation and coding scheme and redundancy version
Resource block assignment and hopping resource allocation
HARQ process number -continued Modulation and coding scheme
Redundancy version
Resource block assignment
. . .
SPS configuration index In another possible implementation, a new downlink control information (Downlink Control Information, DCI) format is defined for the control signaling. The new DCI format is used to carry information to which a configuration index is added. DCI has a plurality of formats, and is used to transmit different control information. In this embodiment of the present invention, a DCI format is defined for information to which a configuration index is added.

306. The network device sends the control message to the user equipment.

307. The user equipment receives the control message sent by the network device.

308. The user equipment activates at least two SPS configurations based on the control message, and transmits corresponding service data based on each of the at least two activated SPS configurations.

Specifically, the user equipment decodes the control message based on a modulation and coding scheme (Modulation and Coding Scheme, MCS). The MCS may be included in the RRC message, or may be included in the control message. In the prior art, an MCS can be included only in an RRC message, which constitutes some specific limitations. After performing decoding, the user equipment searches for a pre-configured SPS period of each of the at least two SPS configurations based on the pre-configuration index, in the control message, that is corresponding to each SPS pre-configuration, and activates an SPS configuration that matches the pre-configured SPS period of each SPS configuration. The user equipment then transmits the corresponding service data by using the activated SPS configuration. For example, a to-be-transmitted service 1 is corresponding to an SPS configuration A, the SPS configuration A includes an SPS period A, an SPS resource a, and the like, and the user equipment transmits service data of the to-be-transmitted service 1 on the SPS resource a based on the SPS period A.

In a possible implementation, by using the interface Uu between the user equipment and the network device, the user equipment sends/receives service data related to a to-be-transmitted service to/from the network device. In another possible implementation, by using an interface PC5 between user equipments, the user equipment sends/receives service data related to a to-be-transmitted service to/from another user equipment.

When the user equipment supports simultaneous data transmission in two or more SPS periods, if there is an intersecting moment in SPS periods of two or more to-be-transmitted services, the user equipment may simultaneously transmit the two or more to-be-transmitted services at the intersecting moment without affecting one another, thereby improving resource utilization. For example, in FIG. 4, the pre-configured SPS periods corresponding to the configuration index 2 occupy a same subframe as the pre-configured SPS periods corresponding to the configuration index 3. The user equipment may perform transmission in the following manner.

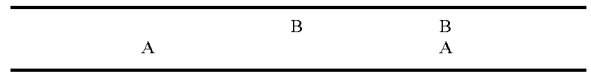

Cells that are labeled as B indicate the pre-configured SPS periods corresponding to the configuration index 2, and cells that are labeled as A indicate the SPS configuration periods corresponding to the configuration index 3. In the same sub-frame, the user equipment may simultaneously transmit data corresponding to two to-be-transmitted services without affecting one another.

After an SPS configuration is activated, if the SPS configuration is not used for service data transmission or the SPS configuration is used to transmit another service, the network device may send a release message to the user equipment to release the SPS configuration. When a period and/or a packet size of a to-be-transmitted service of the at least two to-be-transmitted services changes, the changed to-be-transmitted service is used as a target service. The network device sends a release message to the user equipment, and the user equipment receives the release message, and releases, based on the release message, an SPS configuration used for current transmission of the target service. After the SPS configuration is released, the network device may send an activation message to the user equipment. The activation message includes a new SPS period that matches a service period of the target service. The user equipment receives the activation message and activates, based on the activation message, an SPS configuration that matches the new SPS period of the target service. In this case, the SPS configuration corresponding to the new SPS period overrides the previously used SPS configuration.

In this embodiment of the present invention, the RRC message includes the at least two pre-configurations and the at least two pre-configuration indexes, so as to overcome a prior-art limitation that an RRC message includes only one pre-configuration. In this way, SPS is more flexible, and signaling overheads can be reduced.

Figure 5:
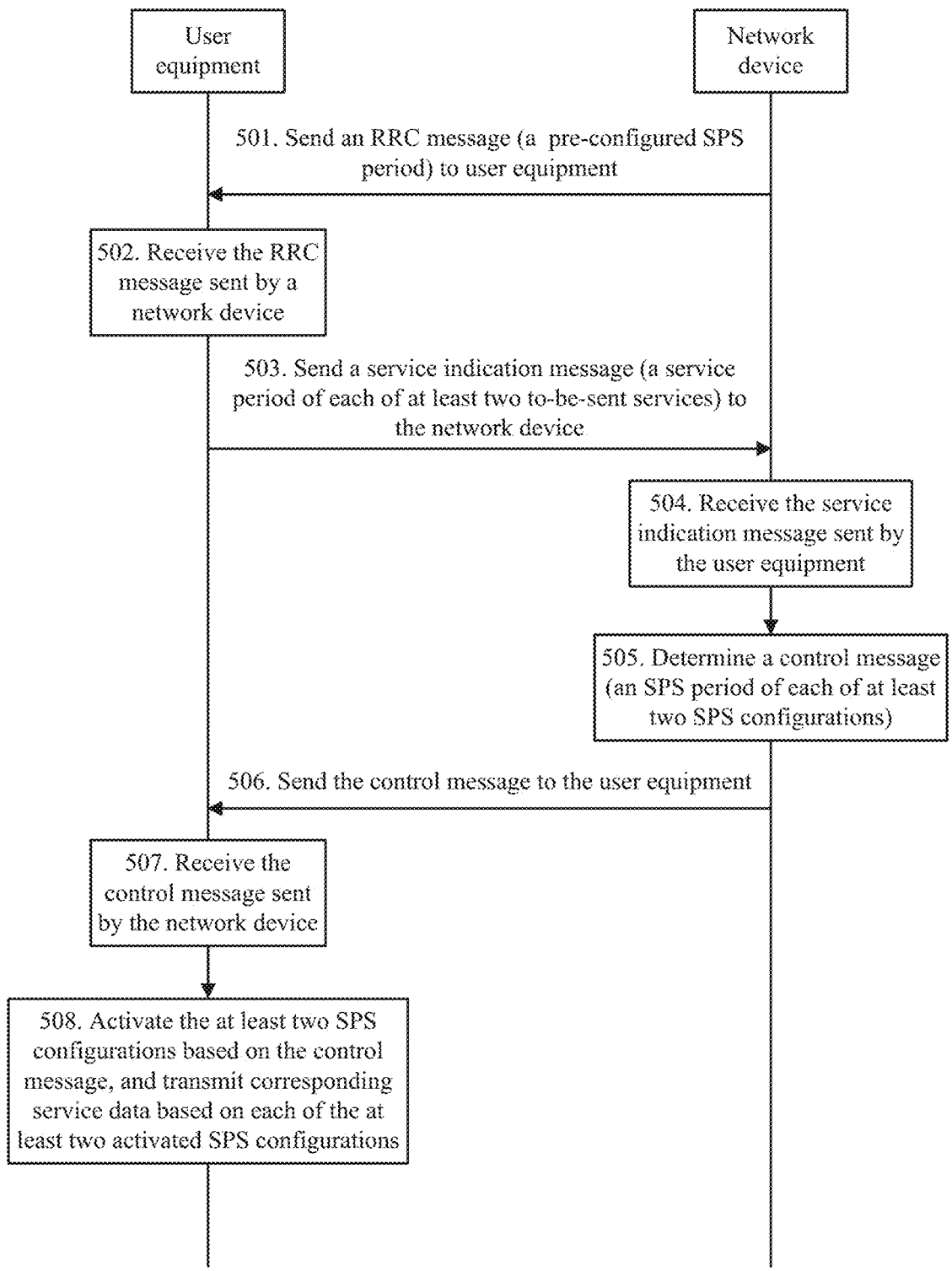
FIG. 5 is a schematic flowchart of a service data transmission method according to Embodiment 3 of the present invention.

Referring to FIG. 5, FIG. 5 is a schematic flowchart of a service data transmission method according to Embodiment 3 of the present invention. As shown in FIG. 5, the method provided in Embodiment 3 of the present invention may include the following content of 501 to 508. In the method shown in FIG. 5, for content the same as or similar to that in the method shown in FIG. 2 or FIG. 3, refer to the related detailed descriptions of FIG. 2 or FIG. 3. Details are not repeated herein.

501. A network device sends an RRC message to user equipment, where the RRC message includes a pre-configured SPS period.

Specifically, after establishing an RRC connection to the user equipment, the network device sends the RRC message to the user equipment. The RRC message includes the pre-configured SPS period, and there is one pre-configured SPS period, and a period value of the pre-configured SPS period may be relatively small. The specific RRC message is as follows:

| SPS—Config information element |
|---|
| -- ASN1START |
| SPS-Config ::= SEQUENCE { |
|     semiPersistSchedC-RNTI    C-RNTI    OPTIONAL,    -- Need OR |
|     sps-ConfigDL    SPS-ConfigDL    OPTIONAL,    -- Need ON |
|     sps-ConfigUL    SPS-ConfigUL    OPTIONAL    -- Need ON |
|     sps-ConfigSidelink    SPS-ConfigUL    OPTIONAL    --Need ON |
| } |

502. The user equipment receives the RRC message sent by the network device.

503. The user equipment sends a service indication message to the network device, where the service indication message includes a service period of each of at least two to-be-transmitted services.

504. The network device receives the service indication message sent by the user equipment.

505. The network device determines a control message based on the service period of each to-be-transmitted service, where the control message includes an SPS period of each of at least two SPS configurations.

Specifically, the value of the pre-configured SPS period is relatively small, and therefore the pre-configured SPS period may be defined to indicate at least two SPS periods. For example, it is specified that two bits may indicate four SPS periods, and when more SPS periods are required, more bits may be used.

The network device matches the service period of each to-be-transmitted service against the pre-configured SPS period in the RRC message, to determine an SPS period that matches the service period of each to-be-transmitted service, so as to determine the control message. The control message includes the SPS period of each of the at least two SPS configurations. Optionally, the control message includes an SPS period of each of at least two SPS configurations and a configuration index of each of the at least two SPS configurations. In this case, the configuration index is in the control message, and the pre-configuration index in Embodiment 2 is in the RRC message. The control message is control signaling on a PDCCH or an EPDCCH.

In a possible implementation, an SPS period field is added to the control signaling on the PDCCH or the EPDCCH, to indicate a to-be-activated or to-be-released SPS period. Content of the control signaling to which the field is added is as follows. The last two rows indicate added fields used to indicate an SPS period. Lengths of these two fields may be determined based on a quantity of SPS periods.

TPC command for scheduled PUSCH
Cyclic shift DM RS
Modulation and coding scheme and redundancy version
Resource block assignment and hopping resource allocation
HARQ process number
Modulation and coding scheme
Redundancy version
Resource block assignment
. . .
SPS period
SPS configuration index (optional)

In another possible implementation, a new DCI format is defined for the control signaling. The new DCI format is used to carry an SPS period and other information; and optionally, the new DCI format is used to carry a configuration index.

506. The network device sends the control message to the user equipment.

507. The user equipment receives the control message sent by the network device.

508. The user equipment activates the at least two SPS configurations based on the control message, and transmits corresponding service data based on each of the at least two activated SPS configurations.

Specifically, the user equipment decodes the control message based on an MCS. The MCS may be included in the RRC message, or may be included in the control message. After performing decoding, the user equipment activates an SPS configuration that matches the SPS period of each SPS configuration, and transmits corresponding service data by using the activated SPS configuration that matches the SPS period of each SPS configuration.

In a possible implementation, by using an interface Uu between the user equipment and the network device, the user equipment sends/receives service data related to a to-be-transmitted service to/from the network device. In another possible implementation, by using an interface PC5 between user equipments, the user equipment sends/receives service data related to a to-be-transmitted service to/from another user equipment.

When the user equipment supports simultaneous data transmission in two or more SPS periods, if there is an intersecting moment in SPS periods of two or more to-be-transmitted services, the user equipment may simultaneously transmit the two or more to-be-transmitted services at the intersecting moment without affecting one another, thereby improving resource utilization.

After an SPS configuration is activated, if the SPS configuration is not used for service data transmission or the SPS configuration is used to transmit another service, the network device may send a release message to the user equipment to release the SPS configuration. When a period and/or a packet size of a to-be-transmitted service of the at least two to-be-transmitted services changes, the changed to-be-transmitted service is used as a target service. In a possible implementation, the network device sends a release message to the user equipment, and the user equipment receives the release message, and releases, based on the release message, an SPS configuration used for current transmission of the target service. After the SPS configuration is released, the network device may send an activation message to the user equipment. The activation message includes a new SPS period that matches a service period of the target service. The user equipment receives the activation message and activates, based on the activation message, an SPS configuration that matches the new SPS period of the target service. In this case, the SPS configuration corresponding to the new SPS period overrides the previously used SPS configuration. In another possible implementation, the network device sends an update message to the user equipment. The update message includes a to-be-updated target SPS period or a configuration index of a to-be-updated target SPS configuration. The user equipment activates, based on the update message, an SPS configuration that matches the target SPS period. The update message is control signaling on a PDCCH or an EPDCCH. The to-be-updated target SPS period is a new SPS period required by a target service whose period and/or packet size changes.

In this embodiment of the present invention, the RRC message includes one pre-configured SPS period, and the control message indicates an SPS configuration required by an actual to-be-transmitted service. In this way, SPS is more flexible, and signaling overheads can be reduced.

Figure 6:
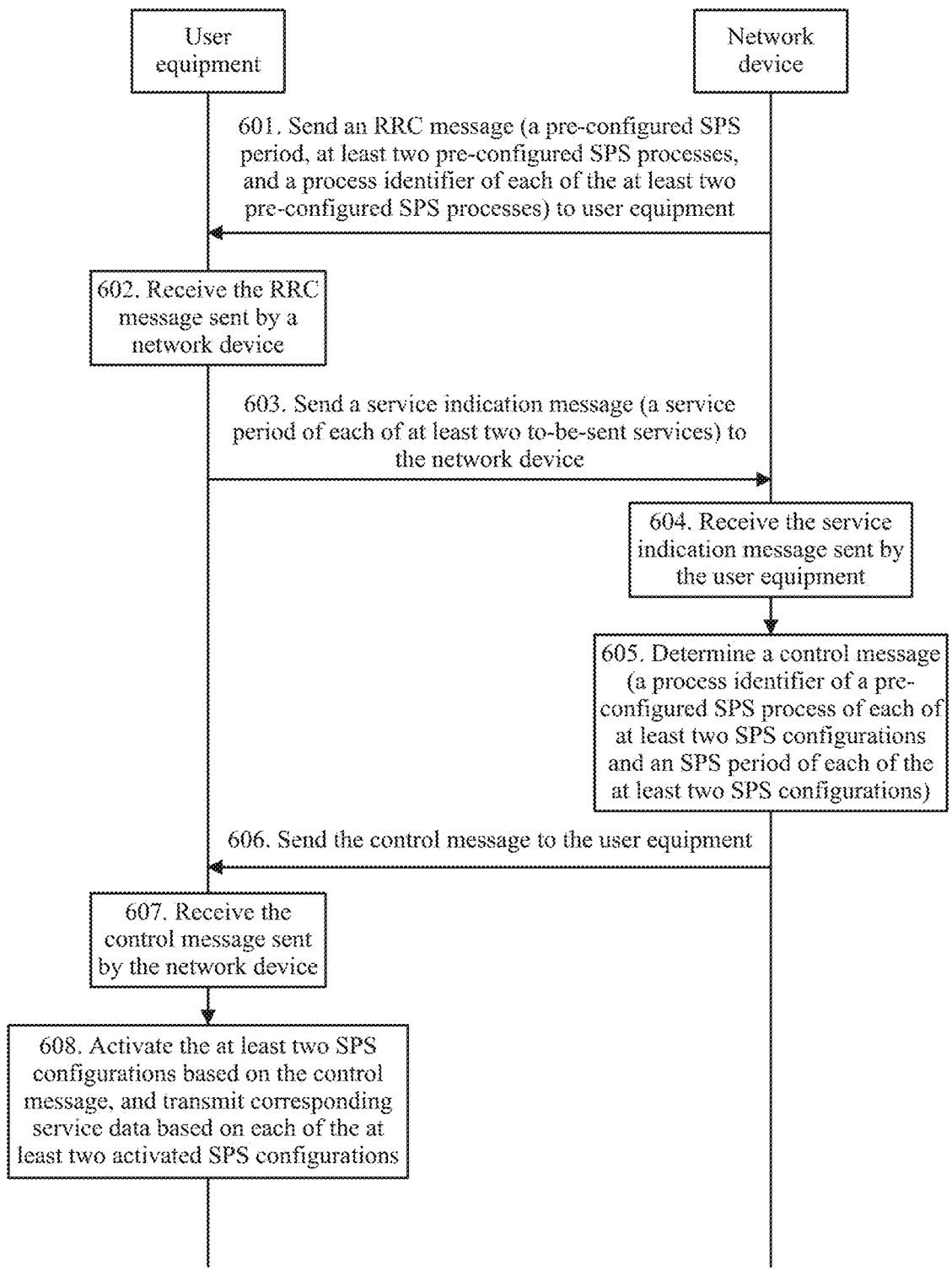
FIG. 6 is a schematic flowchart of a service data transmission method according to Embodiment 4 of the present invention.

Referring to FIG. 6, FIG. 6 is a schematic flowchart of a service data transmission method according to Embodiment 4 of the present invention. As shown in FIG. 6, the method provided in Embodiment 4 of the present invention may include the following content of 601 to 608. In the method shown in FIG. 6, for content the same as or similar to that in the method shown in FIG. 2, FIG. 3, or FIG. 5, refer to the related detailed descriptions of FIG. 2, FIG. 3, or FIG. 5. Details are not repeated herein.

601. A network device sends an RRC message to user equipment, where the RRC message includes a pre-configured SPS period, at least two pre-configured SPS processes, and a process identifier of each of the at least two pre-configured SPS processes.

Specifically, after establishing an RRC connection to the user equipment, the network device sends the RRC message to the user equipment. The RRC message includes a pre-configured SPS period, at least two pre-configured SPS processes, and a process identifier of each of the at least two pre-configured SPS processes. There is one pre-configured SPS period, and a period value of the pre-configured SPS period may be relatively small. The specific RRC message is as follows:

| SPS—Config information element | | | |
|---|---|---|---|
| -- ASN1START | | | |
| SPS-Config ::= SEQUENCE { | | | |
| semiPersistSchedC-RNTI | C-RNTI | OPTIONAL, | -- Need OR |
| sps-ConfigDL | SPS-ConfigDL | OPTIONAL, | -- Need ON |
| sps-ConfigUL | SPS-ConfigUL | OPTIONAL | -- Need ON |

-continued

```
                    SPS—Config information element
    sps-ConfigSidelink        SPS-ConfigUL      OPTIONAL         --Need ON
}
SPS-ConfigUL ::=   CHOICE {
    release                   NULL,
    setup                     SEQUENCE {
        semiPersistSchedIntervalUL    ENUMERATED {
                                          sf10, sf20, sf32, sf40, sf64, sf80,
                                          sf128, sf160, sf320, sf640, spare6,
                                          spare5, spare4, spare3, spare2,
                                          spare1},
        implicitReleaseAfter          ENUMERATED {e2, e3, e4, e8},
        numberOfConfSPS-Processes     INTEGER(1...8),
        p0-Persistent                 SEQUENCE {
            p0-NominalPUSCH-Persistent    INTEGER (-126..24),
            p0-UE-PUSCH-Persistent        INTEGER (-8..7)
        }   OPTIONAL,                                     -- Need OP
        twoIntervalsConfig            ENUMERATED {true}    OPTIONAL,   --   Cond
TDD
        ...,
        [[  p0-PersistentSubframeSet2-r12    CHOICE {
                release                       NULL,
                setup                         SEQUENCE {
                    p0-NominalPUSCH-PersistentSubframeSet2-r12    INTEGER (-126..24),
                    p0-UE-PUSCH-PersistentSubframeSet2-r12        INTEGER (-8..7)
                }
            }                                              OPTIONAL   --
Need ON
        ]]
    }
}
```

602. The user equipment receives the RRC message sent by the network device.

603. The user equipment sends a service indication message to the network device, where the service indication message includes a service period of each of at least two to-be-transmitted services.

604. The network device receives the service indication message sent by the user equipment.

605. The network device determines a control message, where the control message includes a process identifier of a pre-configured SPS process of each of at least two SPS configurations and an SPS period of each of the at least two SPS configurations.

Specifically, the value of the pre-configured SPS period is relatively small, and therefore the pre-configured SPS period may be defined to indicate at least two SPS periods, and an SPS period may be allocated to an SPS process based on a process identifier of the SPS process. For example, it is specified that two bits may indicate four SPS periods, and when more SPS periods are required, more bits may be used.

The network device matches the service period of each to-be-transmitted service against the pre-configured SPS period in the RRC message, to determine an SPS period that matches the service period of each to-be-transmitted service, so as to determine the control message. The control message includes the process identifier of the pre-configured SPS process of each of the at least two SPS configurations and the SPS period of each of the at least two SPS configurations. The control message is control signaling on a PDCCH or an EPDCCH.

In a possible implementation, an SPS period field and an SPS process identifier field are added to the control signaling on the PDCCH or the EPDCCH, to indicate a to-be-activated or to-be-released SPS period and a process identifier of an SPS process. Content of the control signaling to which the fields are added is as follows. The last two rows indicate the added fields used to indicate the SPS period and the process identifier of the SPS process. Lengths of these two fields may be determined based on a quantity of SPS periods.

```
TPC command for scheduled PUSCH
Cyclic shift DM RS
Modulation and coding scheme and redundancy version
Resource block assignment and hopping resource allocation
HARQ process number
Modulation and coding scheme
Redundancy version
Resource block assignment
. . .
SPS process id
SPS period
```

In another possible implementation, a new DCI format is defined for the control signaling. The new DCI format is used to carry an SPS period, a process identifier of an SPS process, and other information.

606. The network device sends the control message to the user equipment.

607. The user equipment receives the control message sent by the network device.

608. The user equipment activates the at least two SPS configurations based on the control message, and transmits corresponding service data based on each of the at least two activated SPS configurations.

Specifically, the user equipment decodes the control message based on an MCS. The MCS may be included in the RRC message, or may be included in the control message. After performing decoding, the user equipment activates, based on the process identifier of the pre-configured SPS process of each SPS configuration, an SPS configuration that matches the SPS period of each SPS configuration, and transmits corresponding service data by using the activated SPS configuration that matches the SPS period of each SPS configuration. The user equipment searches for an SPS period of each SPS configuration based on the process identifier of the pre-configured SPS process of each SPS configuration, so as to activate the SPS configuration that matches the SPS period of each SPS configuration.

In a possible implementation, by using an interface Uu between the user equipment and the network device, the user equipment sends/receives service data related to a to-be-transmitted service to/from the network device. In another possible implementation, by using an interface PC5 between user equipments, the user equipment sends/receives service data related to a to-be-transmitted service to/from another user equipment.

When the user equipment supports simultaneous data transmission in two or more SPS periods, if there is an intersecting moment in SPS periods of two or more to-be-transmitted services, the user equipment may simultaneously transmit the two or more to-be-transmitted services at the intersecting moment without affecting one another, thereby improving resource utilization.

After an SPS configuration is activated, if the SPS configuration is not used for service data transmission or the SPS configuration is used to transmit another service, the network device may send a release message to the user equipment to release the SPS configuration. When a period and/or a packet size of a to-be-transmitted service of the at least two to-be-transmitted services changes, the changed to-be-transmitted service is used as a target service. In a possible implementation, the network device sends a release message to the user equipment, and the user equipment receives the release message, and releases, based on the release message, an SPS configuration used for current transmission of the target service. After the SPS configuration is released, the network device may send an activation message to the user equipment. The activation message includes a new SPS period that matches a service period of the target service. The user equipment receives the activation message and activates, based on the activation message, an SPS configuration that matches the new SPS period of the target service. In another possible implementation, the network device sends an update message to the user equipment. The update message includes a process identifier of a pre-configured SPS process of a target SPS configuration. The user equipment activates, based on the update message, an SPS configuration that matches an SPS period of the target SPS configuration. The user equipment searches for an SPS period of the target configuration based on the process identifier of the pre-configured SPS process of the target SPS configuration, so as to activate the SPS configuration that matches the SPS period of the target SPS configuration. The update message is control signaling on a PDCCH or an EPDCCH.

In this embodiment of the present invention, the RRC message includes one pre-configured SPS period and at least two pre-configured SPS processes, and the control message indicates an SPS configuration required by an actual to-be-transmitted service. In this way, SPS is more flexible, and signaling overheads can be reduced.

Figure 7:
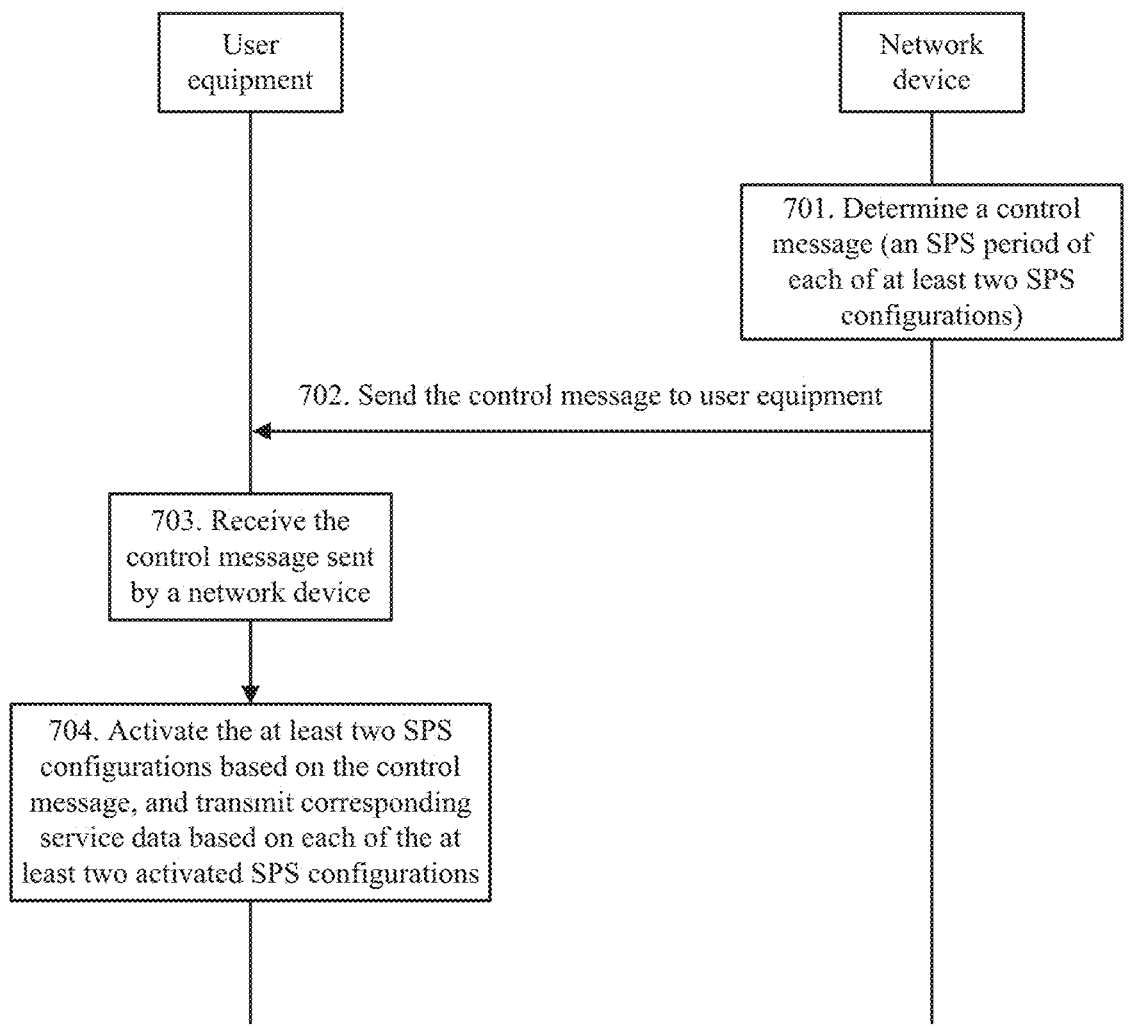
FIG. 7 is a schematic flowchart of a service data transmission method according to Embodiment 5 of the present invention.

Referring to FIG. 7, FIG. 7 is a schematic flowchart of a service data transmission method according to Embodiment 5 of the present invention. As shown in FIG. 7, the method provided in Embodiment 5 of the present invention may include the following content of 701 to 704. In the method shown in FIG. 7, for content the same as or similar to that in the method shown in FIG. 2, FIG. 3, FIG. 5, or FIG. 6, refer to the related detailed descriptions of FIG. 2, FIG. 3, FIG. 5, or FIG. 6, Details are not repeated herein.

701. A network device determines a control message, where the control message includes an SPS period of each of at least two SPS configurations.

Specifically, when detecting that there are at least two to-be-transmitted services, user equipment sends a service indication message to the network device. The service indication message includes a service period of each of the at least two to-be-transmitted services.

Before the user equipment sends the service indication message to the network device, the user equipment receives an RRC message sent by the network device. In this case, the RRC message includes or does not include a pre-configured SPS period, and the pre-configured SPS period is an SPS period allocated by a network device to user equipment in the prior art.

The network device receives the service indication message sent by the user equipment, and determines, based on the service period of each to-be-transmitted service, an SPS period that matches the service period of each to-be-transmitted service, so as to determine the control message. The control message includes the control message includes the SPS period of each of the at least two SPS configurations, or the control message includes the SPS period of each of the at least two SPS configurations and a configuration index of each of the at least two SPS configurations. The control message is control signaling on a PDCCH or an EPDCCH.

In a possible implementation, an SPS period field is added to the control signaling on the PDCCH or the EPDCCH, to indicate a to-be-activated or to-be-released SPS period and an optional configuration index. Content of the control signaling to which the field is added is as follows. The last two rows indicate added fields used to indicate an SPS period and an optional configuration index. Lengths of these two fields may be determined based on a quantity of SPS periods.

TPC command for scheduled P-USCH
Cyclic shift DM RS
Modulation and coding scheme and redundancy version
Resource block assignment and hopping resource allocation
HARQ process number
Modulation and coding scheme
Redundancy version
Resource block assignment
. . .
SPS period
SPS config index (optional)

In another possible implementation, a new DCI format is defined for the control signaling. The new DCI format is used to carry an SPS period, a configuration index, and other information.

702. The network device sends the control message to user equipment.

703. The user equipment receives the control message sent by the network device.

704. The user equipment activates the at least two SPS configurations based on the control message, and transmits corresponding service data based on each of the at least two activated SPS configurations.

Specifically, the user equipment decodes the control message based on an MCS. The MCS may be included in the RRC message, or may be included in the control message. After performing decoding, the user equipment activates an SPS configuration that matches the SPS period of each SPS configuration, and transmits corresponding service data by using the activated SPS configuration that matches the SPS period of each SPS configuration.

In a possible implementation, by using an interface Uu between the user equipment and the network device, the user equipment sends/receives service data related to a to-be-transmitted service to/from the network device. In another possible implementation, by using an interface PC5 between user equipments, the user equipment sends/receives service data related to a to-be-transmitted service to/from another user equipment.

When the user equipment supports simultaneous data transmission in two or more SPS periods, if there is an intersecting moment in SPS periods of two or more to-be-transmitted services, the user equipment may simultaneously transmit the two or more to-be-transmitted services at the intersecting moment without affecting one another, thereby improving resource utilization.

After an SPS configuration is activated, if the SPS configuration is not used for service data transmission or the SPS configuration is used to transmit another service, the network device may send a release message to the user equipment to release the SPS configuration. When a period and/or a packet size of a to-be-transmitted service of the at least two to-be-transmitted services changes, the changed to-be-transmitted service is used as a target service. In a possible implementation, the network device sends a release message to the user equipment, and the user equipment receives the release message, and releases, based on the release message, an SPS configuration used for current transmission of the target service. After the SPS configuration is released, the network device may send an activation message to the user equipment. The activation message includes a new SPS period that matches a service period of the target service. The user equipment receives the activation message and activates, based on the activation message, an SPS configuration that matches the new SPS period of the target service. In another possible implementation, the network device sends an update message to the user equipment. The update message includes a to-be-updated target SPS period or a configuration index of a to-be-updated target SPS configuration. The user equipment activates, based on the update message, an SPS configuration that matches the target SPS period. The update message is control signaling on a PDCCH or an EPDCCH. The to-be-updated target SPS period is a new SPS period required by a target service whose period and/or packet size changes.

In this embodiment of the present invention, the RRC message includes or does not include a pre-configured SPS period, and the control message indicates an SPS configuration required by an actual to-be-transmitted service. In this way, SPS is more flexible, and signaling overheads can be reduced.

It should be noted that Embodiment 2 to Embodiment 5 are four parallel solutions, and any one of the solutions may be executed.

The solutions in the embodiments of the present invention are mainly described from a perspective of interaction between devices. It can be understood that, to implement the foregoing functions, the devices such as the user equipment and the network device include corresponding hardware structures and/or software modules for implementing the functions. A person of ordinary skill in the art should easily be aware that the units and the algorithm steps in the examples described with reference to the embodiments disclosed in this specification can be implemented by hardware or a combination of hardware and computer software. Whether the functions are performed by hardware or in a manner of computer software driving hardware depends on particular applications and design constraints of the technical solutions. A person skilled in the art may use a different method to implement the described functions for each particular application, but it should not be considered that the implementation goes beyond the scope of the present invention.

In the embodiments of the present invention, the user equipment, the network device, and the like may be divided into function units based on the foregoing method examples. For example, the function units may be obtained through division based on functions, or two or more functions may be integrated into one processing unit. The integrated unit may be implemented in a form of hardware, or may be implemented in a form of a software functional unit. It should be noted that the unit division in the embodiments of the present invention is an example and merely logical function division, and may be other division in actual implementation.

Figure 8A:
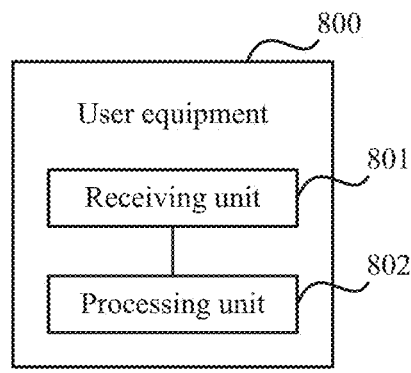
FIG. 8a is a schematic structural diagram of user equipment according to an embodiment of the present invention.

When an integrated unit is used, FIG. 8a shows a possible schematic structural diagram of the user equipment used in the foregoing embodiments. The user equipment 800 includes a receiving unit 801 and a processing unit 802. The receiving unit 801 is configured to support the user equipment in performing a receiving operation of the user equipment. For example, the receiving unit 801 is configured to support the user equipment in performing the process 203 in FIG. 2, the process 302 and the process 307 in FIG. 3, the process 502 and the process 507 in FIG. 5, the process 602 and the process 607 in FIG. 6, the process 703 in FIG. 7, and/or another process of the technology described in this specification. The processing unit 802 is configured to control and manage an operation of the user equipment. For example, the processing unit 802 is configured to support the user equipment in performing the process 204 in FIG. 2, the process 308 in FIG. 3, the process 508 in FIG. 5, the process 704 in FIG. 7, and/or another process of the technology described in this specification. The user equipment 800 further includes a sending unit that is not shown in FIG. 8a. The sending unit is configured to support the user equipment in performing a sending operation of the user equipment. For example, the sending unit is configured to support the user equipment in performing the process 303 in FIG. 3, the process 503 in FIG. 5, the process 603 in FIG. 6, and/or another process of the technology described in this specification. The user equipment 800 may further include a storage unit that is not shown in FIG. 8a and that is configured to store program code and data of the user equipment.

The processing unit 802 may be a processor or a controller. For example, the processing unit 802 may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware device, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The storage unit may be a memory.

Figure 8B:
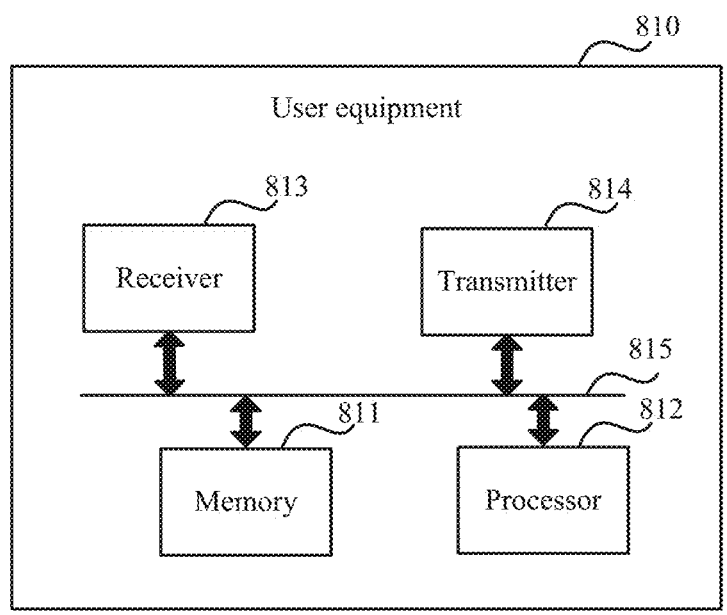
FIG. 8b is a schematic structural diagram of another user equipment according to an embodiment of the present invention.

When the processing unit 802 is a processor, the sending unit is a transmitter, the receiving unit 801 is a receiver, and the storage unit is a memory, the user equipment used in this embodiment of the present invention may be user equipment shown in FIG. 8b.

Referring to FIG. 8b, the user equipment 810 includes a processor 812, a receiver 813, a transmitter 814, and a memory 811. Optionally, the user equipment 810 may further include a bus 815. Optionally, the receiver 813 and the transmitter 814 may be combined as a transceiver. The receiver 813, the transmitter 814, the processor 812, and the memory 811 may be connected to each other by using the bus 815. The bus 815 may be a Peripheral Component Interconnect (Peripheral Component Interconnect, PCI for short) bus, an extended industry standard architecture (Extended Industry Standard Architecture, EISA for short) bus, or the like. The bus 815 may be classified into an address bus, a data bus, a control bus, and the like. For ease of representation, only one thick line is used to represent the bus in FIG. 8b, but this does not mean that there is only one bus or only one type of bus.

Figure 9A:
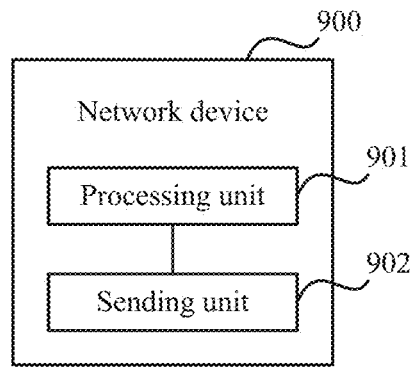
FIG. 9a is a schematic structural diagram of a network device according to an embodiment of the present invention.

When an integrated unit is used, FIG. 9A shows a possible schematic structural diagram of the network device used in the foregoing embodiments. The network device 900 includes a processing unit 901 and a sending unit 902. The processing unit 901 is configured to control and manage an operation of the network device. For example, the processing unit 901 is configured to support the network device in performing the process 201 in FIG. 2, the process 305 in FIG. 3, the process 505 in FIG. 5, the process 605 in FIG. 6, the process 701 in FIG. 7, and/or another process of the technology described in this specification. The sending unit 902 is configured to support the network device in performing a sending operation of the network device. For example, the sending unit 902 is configured to support the network device in performing the process 202 in FIG. 2, the process 301 and the process 306 in FIG. 3, and the process 501 and the process 506 in FIG. 5, the process 601 and the process 606 in FIG. 6, the process 701 in FIG. 7, and/or another process of the technology described in this specification. The network device 900 may further include a receiving unit that is not shown in FIG. 9a. The receiving unit is configured to support the network device in performing a receiving operation of the network device. For example, the receiving unit is configured to support the network device in performing the process 304 in FIG. 3, the process 504 in FIG. 5, the process 604 in FIG. 6, and/or another process of the technology described in this specification. The network device 900 may further include a storage unit that is not shown in FIG. 9a and that is configured to store program code and data of the network device.

The processing unit 901 may be a processor or a controller. For example, the processing unit 901 may be a CPU, a general purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The receiving unit and the sending unit 902 may be a transceiver, a transceiver circuit, a communications interface, or the like. The storage unit may be a memory.

Figure 9B:
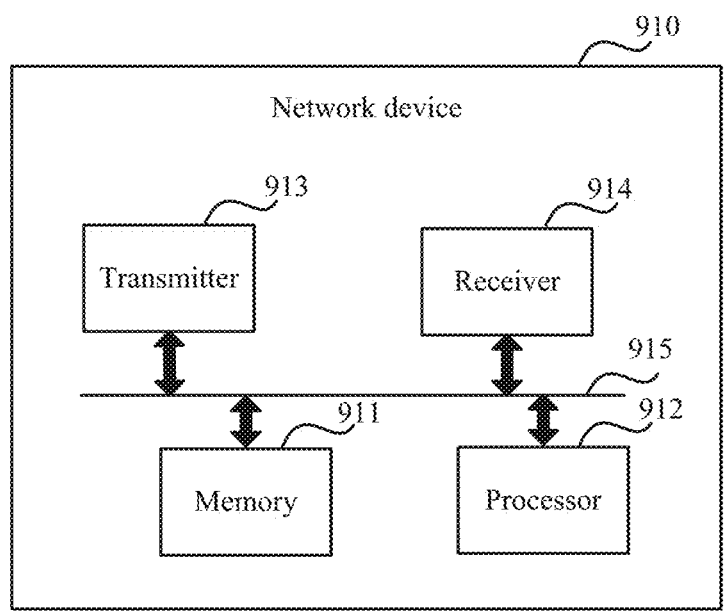
FIG. 9b is a schematic structural diagram of another network device according to an embodiment of the present invention.

When the processing unit 901 is a processor, the receiving unit is a receiver, the sending unit 902 is a transmitter, and the storage unit is a memory, the network device used in this embodiment of the present invention may be a network device shown in FIG. 9B.

Referring to FIG. 9B, the network device 910 includes a processor 912, a transmitter 913, a receiver 914, and a memory 911. Optionally, the network device 910 may further include a bus 915. Optionally, the transmitter 913 and the receiver 914 may be combined as a transceiver. The transmitter 913, the receiver 914, the processor 912, and the memory 911 may be connected to each other by using the bus 915. The bus 915 may be a Peripheral Component Interconnect bus, an extended industry standard structure bus, or the like. The bus 915 may be classified into an address bus, a data bus, a control bus, and the like. For ease of representation, only one thick line is used to represent the bus in FIG. 9B, but this does not mean that there is only one bus or only one type of bus.

Methods or algorithm steps described with reference to the content disclosed in this embodiment of the present invention may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

The invention claimed is:

1. A service data transmission method, comprising:
   receiving, by user equipment from a network device, a radio resource control (RRC) message that comprises preset semi-persistent scheduling (SPS) information, wherein the preset SPS information comprises at least one of: a first pre-configured SPS period, a first pre-configuration index corresponding to the first pre-configured SPS period, a second pre-configured SPS period, or a second pre-configuration index corresponding to the second pre-configured SPS period;
   receiving, by the user equipment from the network device, a first message, wherein the first control message comprises the first pre-configuration index;
   activating, by the user equipment, a first SPS configuration corresponding to the first pre-configuration index in the first message; and
   transmitting, by the user equipment, first service data based on the first SPS configuration.

2. The method according to claim 1, wherein further comprising, after the receiving, by user equipment, a radio resource control (RRC) message:
   receiving, by the user equipment from the network device, a second message, wherein the second message comprises the second pre-configuration index;
   activating, by the user equipment, a second SPS configuration corresponding to the second pre-configuration index in the second message; and
   transmitting, by the user equipment, second service data based on the second SPS configuration.

3. The method according to claim 2, wherein the first SPS configuration and the second SPS configuration are active simultaneously.

4. The method according to claim 1, wherein further comprising, after the activating, by the user equipment, a first SPS configuration:
   receiving, by the user equipment from the network device, a release message, wherein the release message indicates the first SPS configuration; and
   releasing, by the user equipment, the first SPS configuration based on the release message.

5. The method according to claim 4, wherein the release message comprises the first pre-configuration index for indicating the first SPS configuration.

6. The method according to claim 1, wherein the first message is a control signaling transmitted on a physical downlink control channel (PDCCH) or an enhanced PDCCH.

7. The method according to claim 1, wherein the first message is downlink control information (DCI).

8. The method according to claim 1, wherein the first message further comprises the second pre-configuration index, and the method further comprises:
   activating, by the user equipment, a second SPS configuration corresponding to the second pre-configuration index in the first message; and
   transmitting, by the user equipment, second service data based on the second SPS configuration.

9. The method according to claim 1, wherein the first message further comprises information indicating a physical resource for the first SPS configuration.

10. The method according to claim 1, wherein further comprising, after the activating, by the user equipment, a first SPS configuration:
    receiving, by the user equipment from the network device, an update message, wherein the update message comprises a to-be-updated SPS period corresponding to the first pre-configuration index; and
    updating, by the user equipment, the first SPS configuration based on the to-be-updated SPS period in the update message.

11. The method according to claim 1, wherein further comprising, before the receiving, by the user equipment from the network device, a first message:
    sending a service indication message to the network device, where the service indication message includes a service period of a first service, wherein the first message is determined based on the service period.

12. A service data transmission method, comprising:
    sending, by a network device to user equipment, a radio resource control (RRC) message that comprises preset semi-persistent scheduling (SPS) information, wherein the preset SPS information comprises at least one of a first pre-configured SPS period, a first pre-configuration index corresponding to the first pre-configured SPS period, a second pre-configured SPS period, or a second pre-configuration index corresponding to the second pre-configured SPS period;
    determining, by the network device, a first message, wherein the first control message comprises the first pre-configuration index; and
    sending, by the network device to the user equipment, the first message to instruct the user equipment to activate a first SPS configuration.

13. The method according to claim 12, wherein further comprising, after the sending, by a network device to user equipment, a radio resource control (RRC) message:
    determining, by the network device, a second message, wherein the second message comprises the second pre-configuration index; and
    sending, by the network device to the user equipment, the second message to instruct the user equipment to activate a second SPS configuration.

14. The method according to claim 13, wherein the first SPS configuration and the second SPS configuration are active simultaneously.

15. The method according to claim 12, wherein further comprising, after the sending, by the network device to the user equipment, a first message:
    sending, by the network device to the user equipment, a release message, wherein the release message indicates the first SPS configuration and instructs the user equipment to release the first SPS configuration.

16. User equipment comprising:
    a receiver configured to:
        receive a radio resource control (RRC) message that comprises preset semi-persistent scheduling (SPS) information and that is sent by a network device, wherein the preset SPS information comprises at least one of a first pre-configured SPS period, a first pre-configuration index corresponding to the first pre-configured SPS period, a second pre-configured SPS period, or a second pre-configuration index corresponding to the second pre-configured SPS period; and
        receive a first message, wherein the first message comprises the first pre-configuration index;
    at least one processor; and
    a non-transitory computer-readable storage medium coupled to the at least one processor and storing programming instructions for execution by the at least one processor to:

activate a first SPS configuration corresponding to the first pre-configuration index in the first message; and a transmitter configured to:
transmit first service data based on the first SPS configuration.

17. The user equipment according to claim 16, wherein:
the receiver is further configured to: receive a second message, wherein the second message comprises the second pre-configuration index;
the at least one processor is further configured to: activate a second SPS configuration corresponding to the second pre-configuration index in the second message; and
the transmitter is further configured to: transmit second service data based on the second SPS configuration.

18. The user equipment according to claim 17, wherein the first SPS configuration and the second SPS configuration are active simultaneously.

19. A network device comprising:
a transmitter configured to:
send a radio resource control (RRC) message that comprises preset semi-persistent scheduling (SPS) information, wherein the preset SPS information comprises at least one of a first pre-configured SPS period, a first pre-configuration index corresponding to the first pre-configured SPS period, a second pre-configured SPS period, or a second pre-configuration index corresponding to the second pre-configured SPS period;

at least one processor; and a non-transitory computer-readable storage medium coupled to the at least one processor and storing programming instructions for execution by the at least one processor to:
determine a first message, wherein the first message comprises the first pre-configuration index; and
wherein the transmitter is further configured to: send the first message to user equipment to instruct the user equipment to activate a first SPS configuration.

20. The network device according to claim 19, wherein:
the at least one processor is further configured to: determine a second message, wherein the second message comprises the second pre-configuration index; and
the transmitter is further configured to: send the second message to the user equipment to instruct the user equipment to activate a second SPS configuration.

* * * * *